(12) United States Patent
Pang

(10) Patent No.: US 11,317,604 B1
(45) Date of Patent: May 3, 2022

(54) PET DRINKING DEVICE

(71) Applicant: SHENZHEN LINGXIANG TECHNOLOGY CO., LTD., Shenzhen (CN)

(72) Inventor: Honggang Pang, Shenzhen (CN)

(73) Assignee: SHENZHEN LINGXIANG TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 17/458,659

(22) Filed: Aug. 27, 2021

(51) Int. Cl.
*A01K 7/02* (2006.01)

(52) U.S. Cl.
CPC .............. *A01K 7/025* (2013.01); *A01K 7/022* (2013.01)

(58) Field of Classification Search
CPC ................. A01K 7/025; A01K 7/022
See application file for complete search history.

(56) References Cited

U.S. PATENT DOCUMENTS

| | | | |
|---|---|---|---|
| 6,843,205 B1* | 1/2005 | Segreto ................ | A01K 5/0114 119/515 |
| 7,578,261 B2* | 8/2009 | Fick ..................... | A01K 5/0114 119/51.01 |
| 2020/0337266 A1* | 10/2020 | Yu ......................... | C02F 1/002 |

FOREIGN PATENT DOCUMENTS

| | | | |
|---|---|---|---|
| CN | 109349150 A | * | 2/2019 |
| CN | 109479743 A | * | 3/2019 |

* cited by examiner

*Primary Examiner* — Monica L Barlow
*Assistant Examiner* — Brittany A Lowery

(57) ABSTRACT

The present disclosure provides a pet drinking device, including a support base, a water storage container, a cover member, a water injection channel, a water return channel, a water drinking disc, a water pumping device, and an electric control unit. A first accommodation cavity and an accommodation space having at least one opening on one side of the first accommodation cavity are formed on the support base. The water storage container is capable of being take out or placed into the accommodation space from the at least one opening. The cover member is formed above the support base to enclose the first accommodation cavity and cover the accommodation space. The water injection channel is formed on the cover member and/or the support base and communicated with the first accommodation cavity.

11 Claims, 11 Drawing Sheets

PET DRINKING DEVICE

TECHNICAL FIELD

The present disclosure relates to pet feeding equipment, in particular to a pet drinking device.

BACKGROUND

With progress of society, human beings are no longer satisfied with pursuit of material life, and pursuit of spiritual life is becoming equally evident. More and more people around the world are keeping pets, but people can not always be with their pets, so it is best to have intelligent devices to help with pet feeding. Compared to pet drinking, feeding of pets generally has a certain regularity and is more likely to be controlled by humans. In related arts, there are some devices for pet drinking, however, there are some drawbacks to these arts. For example, if the pets do not drink in time, water placement time in a water disc is too long to breed bacteria, and when the pets drink water at the next time, the contaminated water may cause the pets to be sick, even propagate virus to the pets, affect health of the pets, and may also affect health of the human beings. Moreover, structural design in the related arts is unreasonable, so that center of gravity of the devices is too high, and the devices are easily knocked down. The devices lack man-machine interaction function and can not be personalized to set operating parameters.

SUMMARY

The present disclosure aims to solve at least one technical problem in the related arts, and provides a pet drinking device.

In order to solve the technical problems, the present disclosure provides a pet drinking device, including:
- a support base;
- a water storage container;
- a cover member;
- a water injection channel;
- a water return channel;
- a water drinking disc;
- a water pumping device; and
- an electric control unit;

a first accommodation cavity and an accommodation space on one side of the first accommodation cavity are formed on the support base, the accommodation has at least one opening; the water storage container is capable of being taken out or placed into the accommodation space from the at least one opening; the cover member is formed above the support base to enclose the first accommodation cavity and cover the accommodation space; the water injection channel is formed on the cover member and/or the support base and communicating with the first accommodation cavity; the water return channel is formed on the cover member and/or the water storage container and communicating with an inner cavity of the water storage container; the water drinking disc is formed on the cover member and connected with the water return channel; the water pumping disc is disposed between the support base and the cover member and configured to pump water in the first accommodation cavity to the water drinking disc; and the electric control unit is capable of controlling start and stop of the water pumping device.

Furthermore, the first accommodation cavity is integrally formed with the support base, the first accommodation cavity is configured to store clear water, and the water injection channel is communicated with the first accommodation cavity.

Furthermore, a clear water tank is disposed inside the first accommodation cavity, the water injection channel is communicated with the clear water tank, and an opening for taking and placing the clear water tank is disposed on the support base.

Furthermore, an electric control valve is disposed on the water return channel, and the electric control valve is controlled to be connected with the electric control unit.

Furthermore, the water pumping device comprises a water inlet pipe, a water outlet pipe, and a water pump. One end of the water inlet pipe is connected with a water inlet end of the water pump, and another end of the water inlet pipe extends into the first accommodation cavity. One end of the water outlet pipe is connected with a water outlet end of the water pump, and another end of the water outlet pipe is communicated with the water drinking disc.

Furthermore, a motor is disposed on the cover member; the motor is controlled to be connected with the electric control unit, and an output shaft of the motor is rotatably connected with a rotating shaft. The electric control valve includes a valve body and a valve core, and the valve core is connected with the rotating shaft. A water inlet and a water outlet are disposed on the valve body. The water inlet is communicated with the water drinking disc, and the water outlet is communicated with the water storage container. The valve core is disposed on the valve body between the water inlet and the water outlet, and the rotating shaft drives the valve core to rotate to block or open the water outlet.

Furthermore, a U-shaped guide rail is disposed on a bottom of the water storage container, two straight strip-shaped guide blocks matched with the U-shaped guide rail are disposed on a bottom of the accommodation space. An elastic buckle is disposed between the two straight strip-shaped guide blocks. A raised clamping platform is disposed inside an area surrounded by the U-shaped guide rail on the bottom of the water storage container, and the raised clamping platform is configured to match with the elastic buckle.

Furthermore, the pet drinking device includes a first sensing component configured to sense a water level in the first accommodation cavity and a second sensing component configured to sense a water level in the water drinking disc.

Furthermore, the support base is generally in a racetrack shape, and a number of the opening of the accommodation space is one and the opening of the accommodation space is disposed on an end portion along a length direction of the support base.

Furthermore, the cover member includes a bottom cover and a top cover. An installation space is formed between the bottom cover and the top cover. The water pumping device is disposed inside the installation space. The water injection channel penetrates through the bottom cover and the top cover, and a cover is disposed on the water injection channel.

Furthermore, the water outlet of the water outlet pipe is upwards sprayed. A blocking component, having a plate-shaped surface, and a evenly-striped platform are disposed on the cover member. The evenly-striped platform is obliquely disposed inside the water drinking disc, the blocking component is configured to change a water spraying direction, and water flow is splashed and slowly flows back to the evenly-striped platform.

Furthermore, the electric control unit includes a circuit board, a battery, and a power transmission end. The circuit board is disposed on the installation space, and a hole matching with the power transmission end is disposed on the cover member.

Furthermore, a control switch having at least one mode selection is disposed on the cover and the support base, and modes at least comprises a water changing period setting.

Furthermore, the pet drinking device includes an alarm indication device configured to feed back sound and/or light when lacking clear water.

Beneficial effects of the present disclosure are as following.

The present disclosure provides the pet drinking device, including the support base, the water storage container, the cover member, the water injection channel, the water return channel, the water drinking disc, the water pumping device, and an electric control unit. The first accommodation cavity and the accommodation space having at least one opening on one side of the first accommodation cavity are formed on the support base. The water storage container is capable of being taken out or placed into the accommodation space from the at least one opening. The cover member is formed above the support base to enclose the first accommodation cavity and cover the accommodation space. The water injection channel is formed on the cover member and/or the support base and communicated with the first accommodation cavity. The water return channel is formed on the cover member and/or the water storage container and communicated with an inner cavity of the water storage container. The water drinking disc shows an open shape and is formed on the cover member and connected with the water return channel. The water pumping device is disposed between the support base and the cover member and configured to pump water in the first accommodation cavity to the water drinking disc. The electric control unit is capable of controlling start and stop of the water pumping device. The present disclosure adopts a structure of transverse layout, so that center of gravity of the pet drinking device is low, and possibility that the pet drinking device is knocked down or knocked down is reduced. The present disclosure adopts the water storage container to contain water, the water storage container is conveniently taken or placed through disposing the opening on the support base, and meanwhile, due to a fact that the cover member covers the accommodation space, possibility that the waste water is spilled by a large amount can be reduced. The cover member and the support base are of a split type design, so that installation and disassembly are facilitated, and cleaning of the pet drinking device is facilitated. The electric control unit is configured to control the water pumping device to start and stop, water which is not drunk by the timeout can be replaced in time, and water is prevented from being polluted, so that health of pets is guaranteed, and human health is also facilitated.

BRIEF DESCRIPTION OF DRAWINGS

The present disclosure is further described below in conjunction with accompanying drawings.

DETAILED DESCRIPTION

Figure 1:
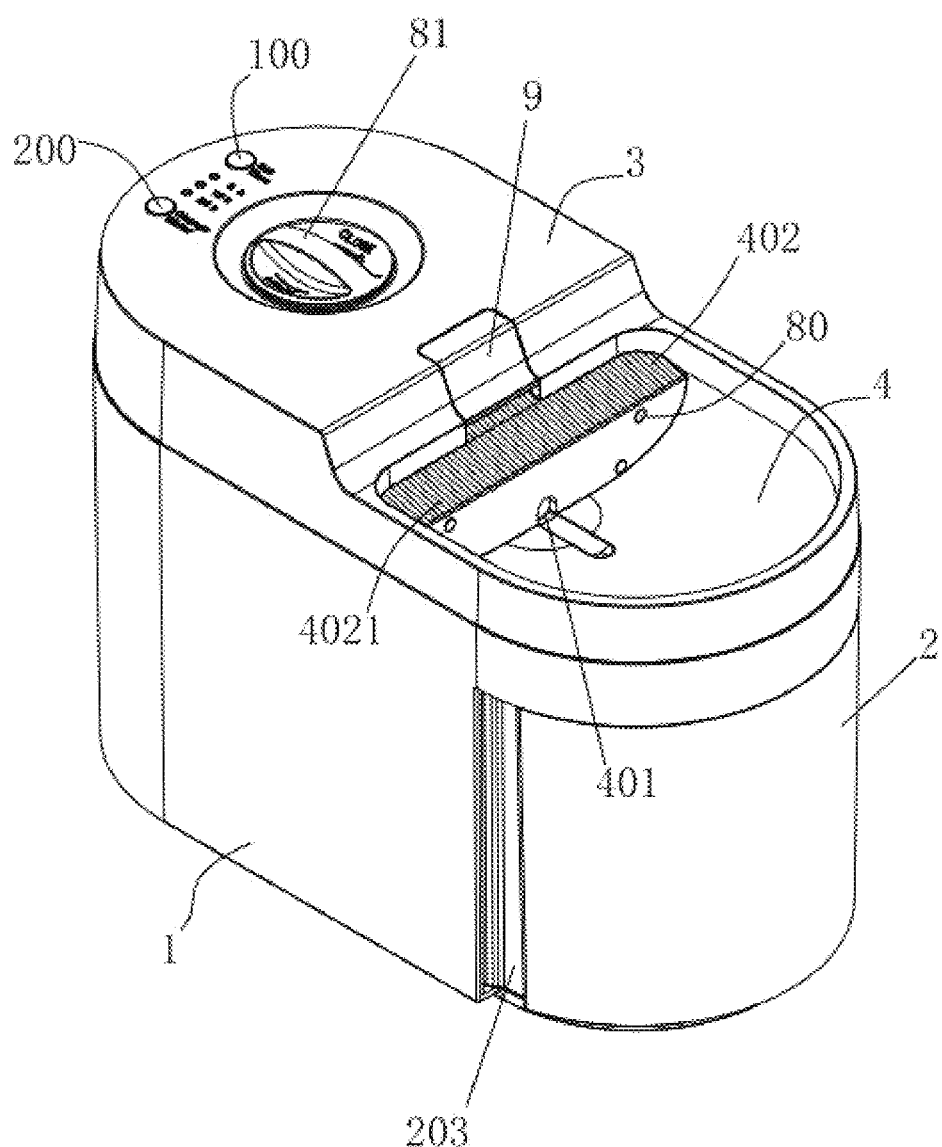
FIG. 1 is an overall structural schematic diagram of a pet drinking device from one direction.
Figure 2:
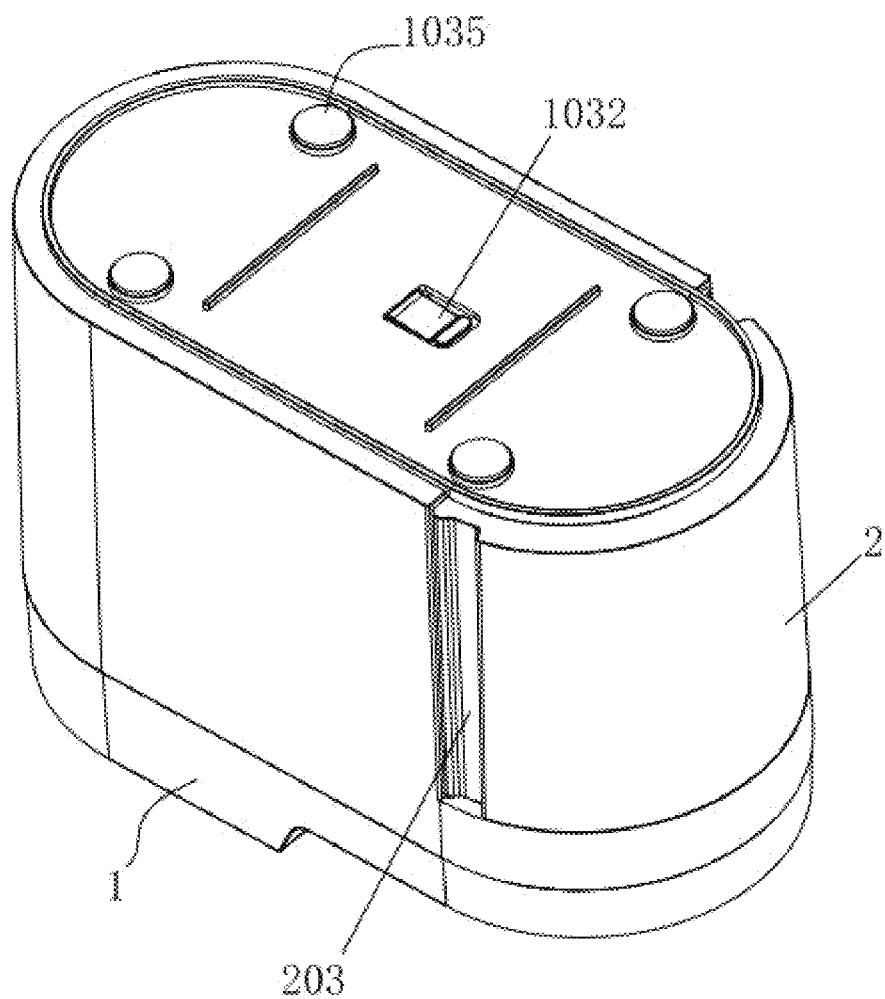
FIG. 2 is an overall structural schematic diagram of the pet drinking device from another direction
Figure 3:
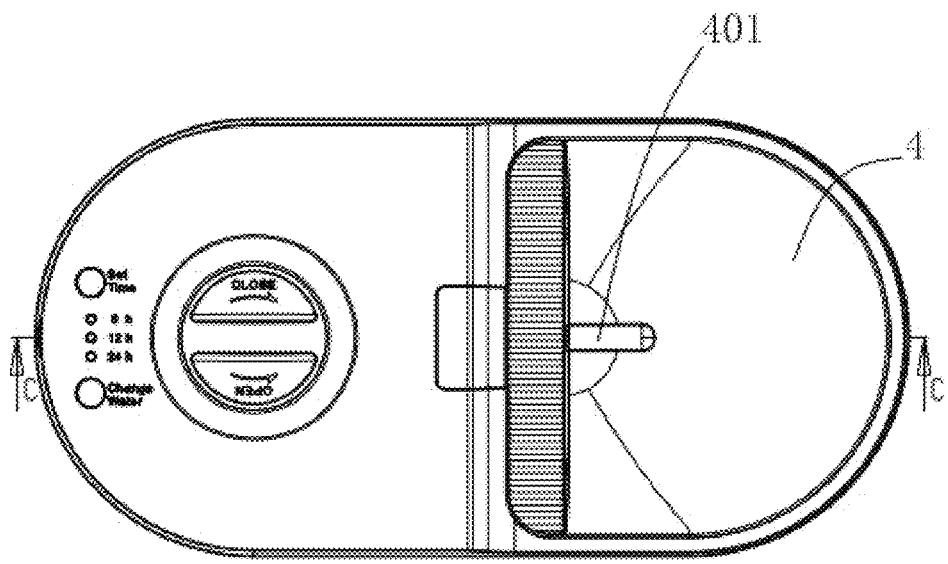
FIG. 3 is a structural schematic diagram of the pet drinking device from a top view direction.
Figure 4:
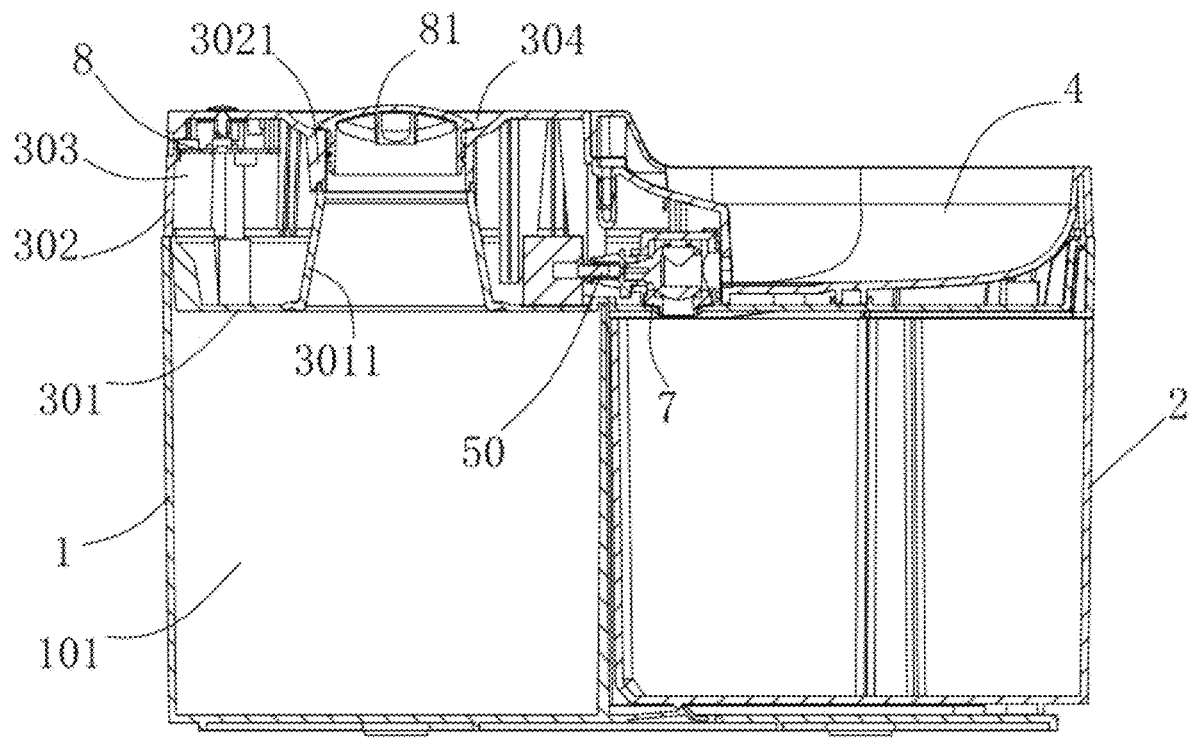
FIG. 4 is a schematic cross-sectional diagram taken along line C-C in FIG. 3.
Figure 5:
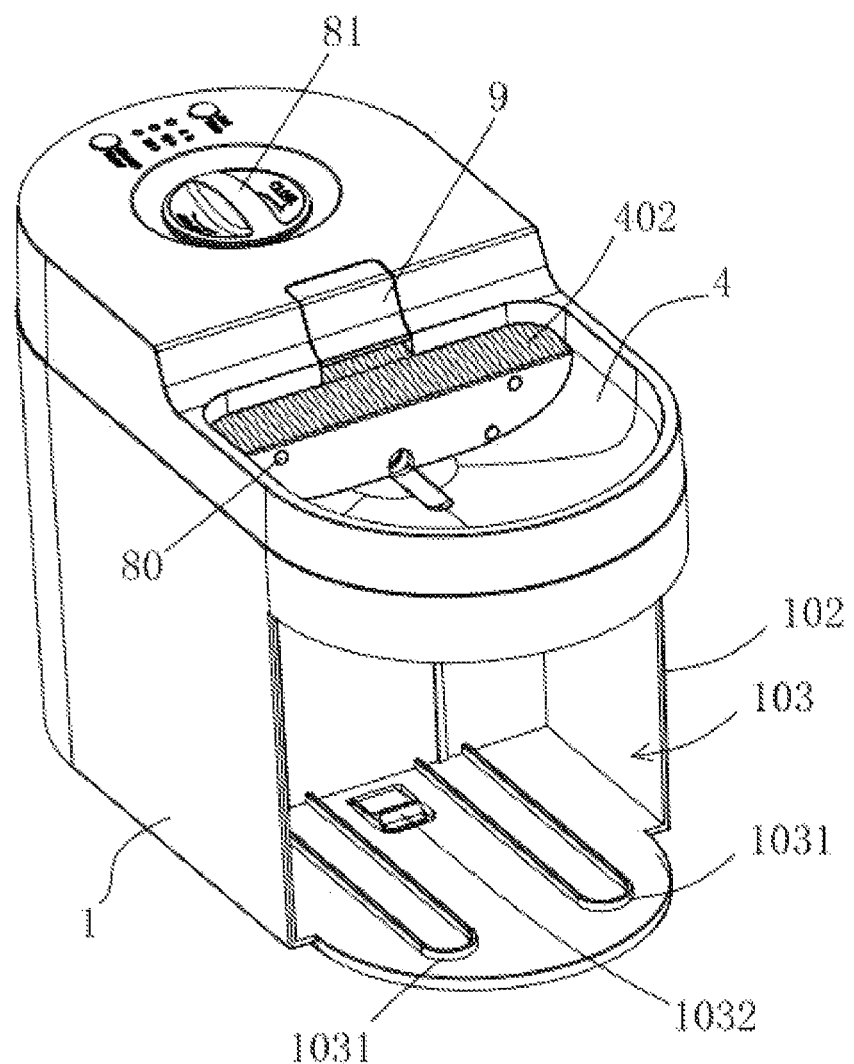
FIG. 5 is a schematic diagram of the pet drinking device after removing a water storage container.
Figure 6:
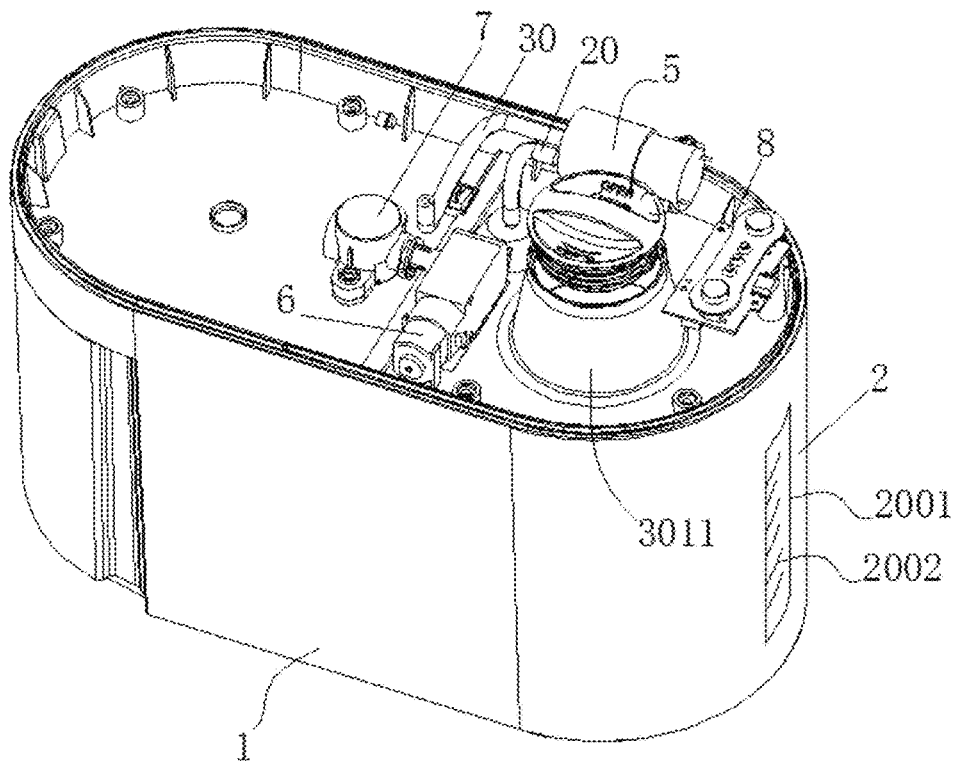
FIG. 6 is a inner structural schematic diagram of the pet drinking device after removing a top cover of a cover member.
Figure 7:
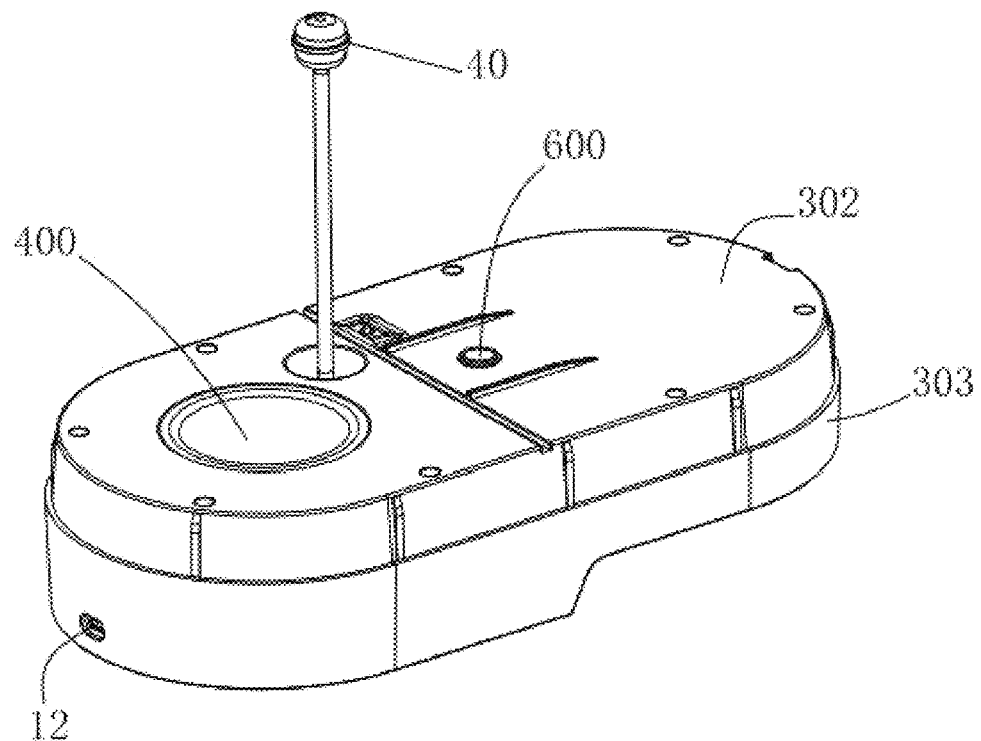
FIG. 7 is a structural schematic diagram of the pet drinking device after removing a support base and the water storage container.
Figure 8:
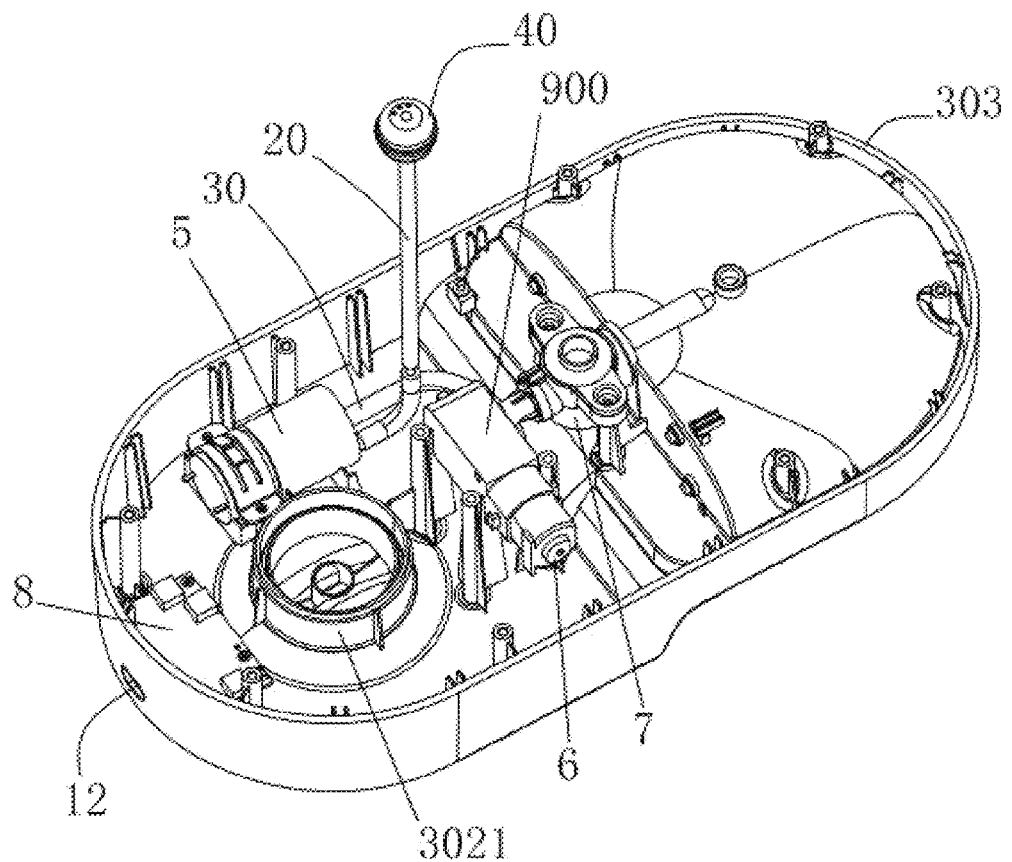
FIG. 8 is a structural schematic diagram of the pet drinking device after removing the support base, the water storage container, and a bottom cover of the cover member.
Figure 9:
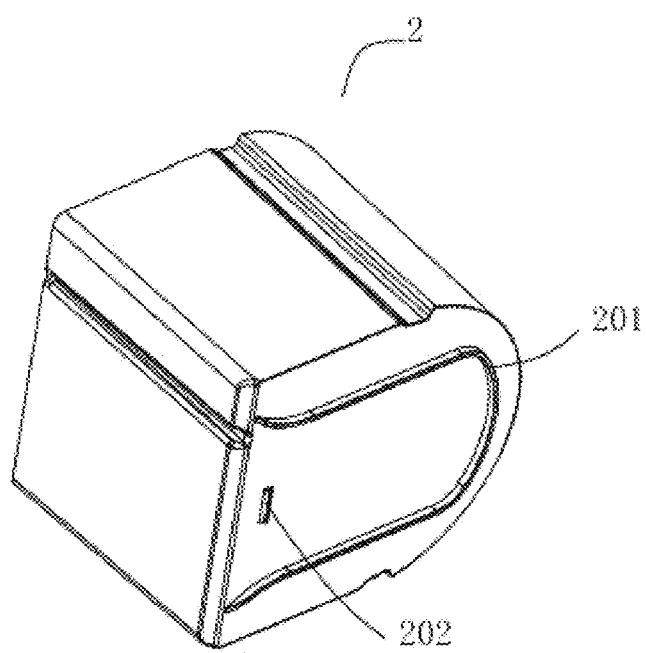
FIG. 9 is a schematic diagram of the water storage container of the pet drinking device from one direction.
Figure 10:
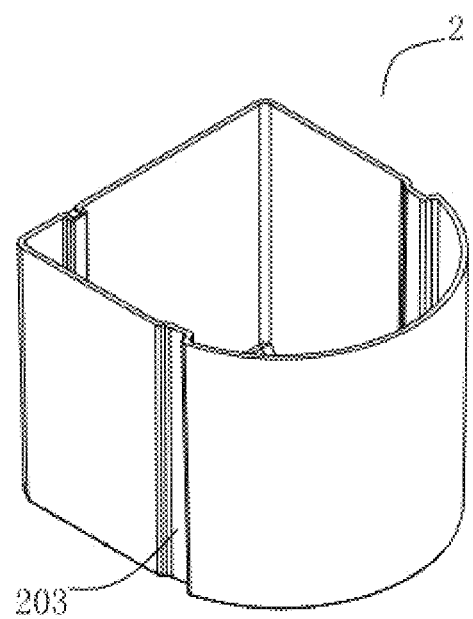
FIG. 10 is a schematic diagram of the water storage container of the pet drinking device from another direction.
Figure 11:
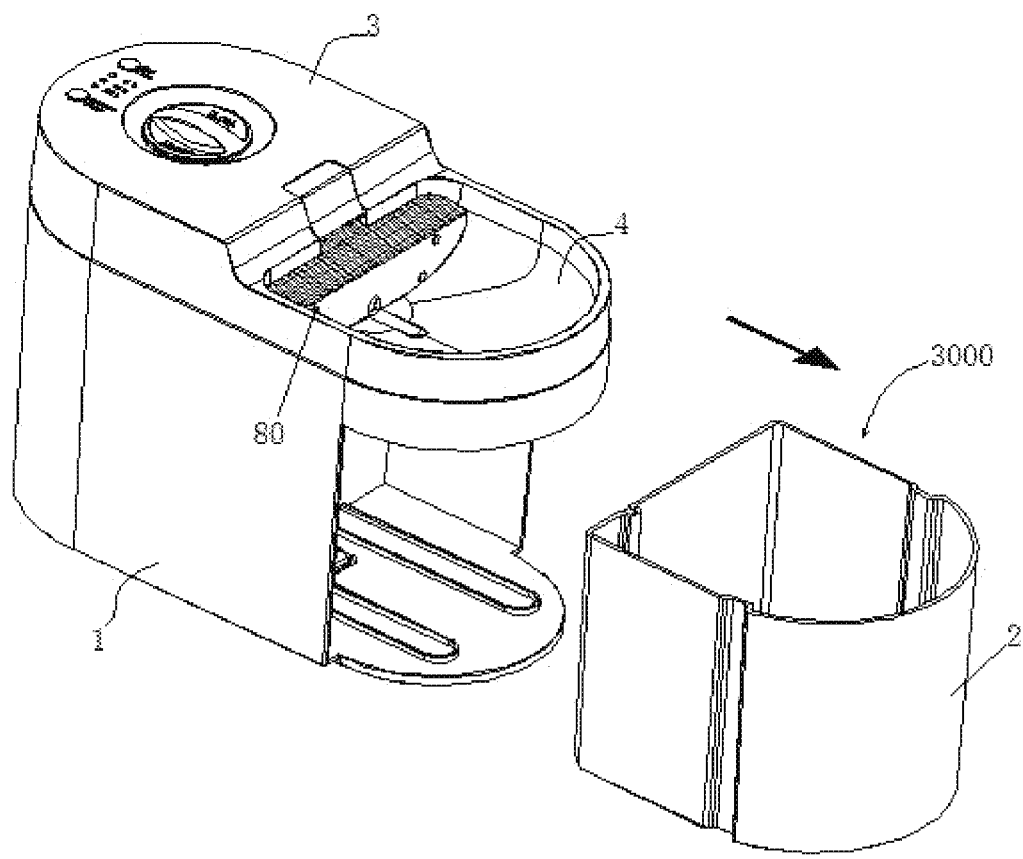
FIG. 11 is schematic diagram of the water storage container being taken out from the pet drinking device.
Figure 12:
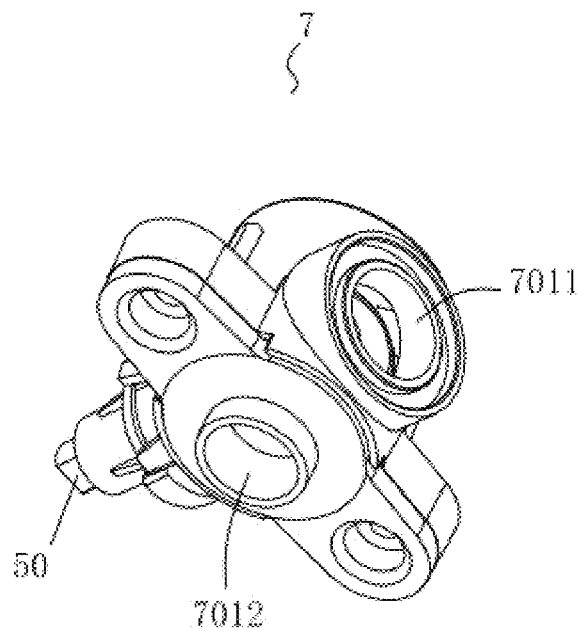
FIG. 12 is a schematic diagram of an electric control valve of the pet drinking device.
Figure 13:
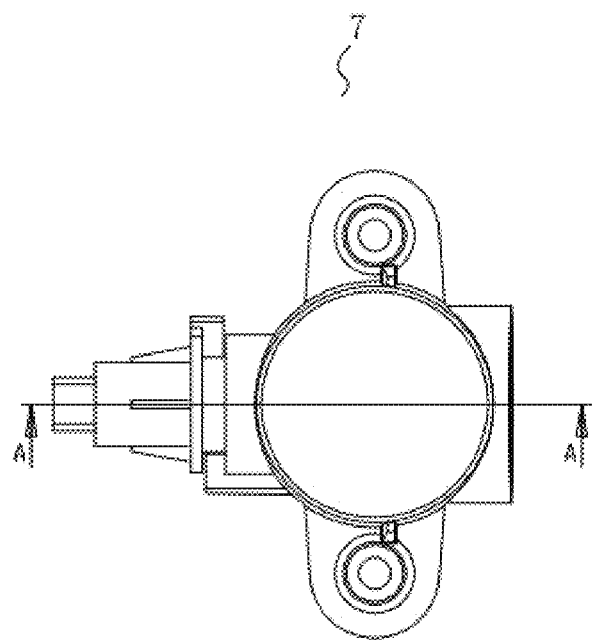
FIG. 13 is a structural schematic diagram of the electric control valve of the pet drinking device from a top view direction.
Figure 14:
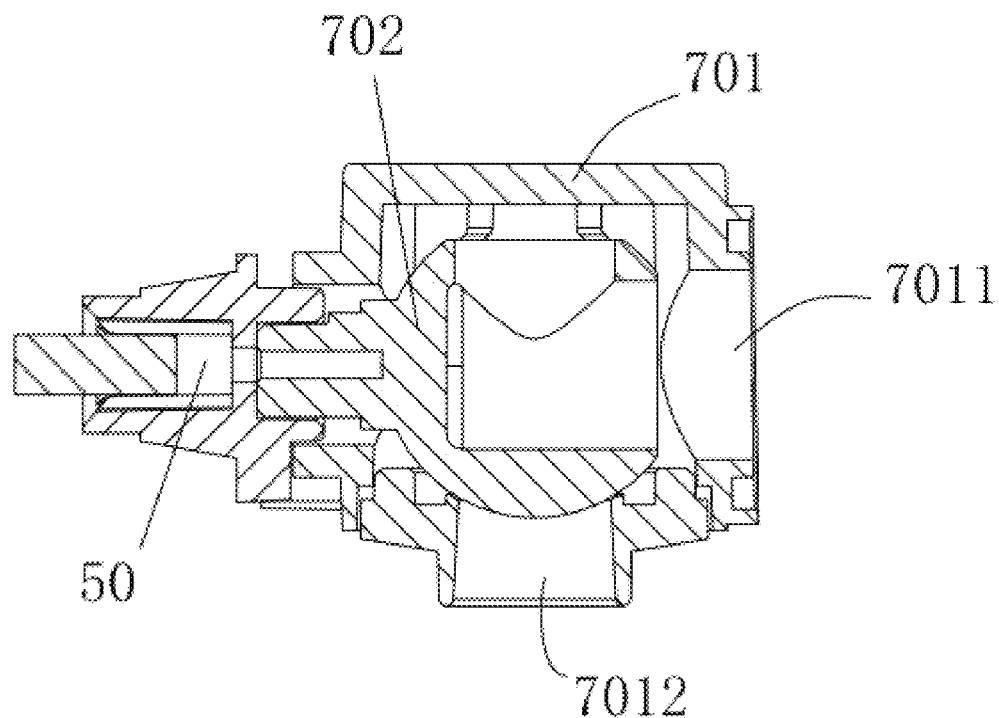
FIG. 14 is a schematic cross-sectional diagram taken along line A-A in FIG. 3.
Figure 15:
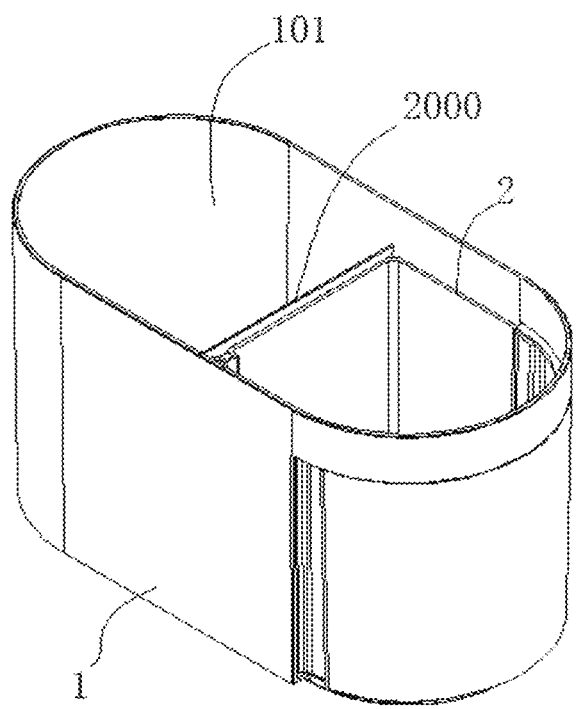
FIG. 15 is an assembly structural schematic diagram of the support base and the water storage container after the pet drinking device removing the cover member.

Embodiments of the present disclosure are described in details below, examples of which are illustrated in the accompanying drawings, wherein same or similar designations from beginning to end indicate the same or similar components or components having the same or similar functions. The embodiments described below with reference to the drawings are exemplary and are intended to be used to explain the present disclosure and are not to be construed as limiting the present disclosure.

In the present disclosure, unless expressly specified and defined otherwise, the terms "dispose", "connect", "connect with", "fixed" and the like are to be construed broadly, for example, may be fixedly connected, may be detachably connected, or integrally connected; may be a mechanical connection, or may be an electrical connection; may be directly connected, may also be indirectly connected by an intermediate medium, or may be in communication with an interior of the two components. Specific meanings of the above-described terms in the present disclosure may be understood by those who skilled in the art based on the specific circumstances.

In the present disclosure, unless expressly specified and defined otherwise, a first feature "on" or "under" a second feature may include the first and second features in direct contact, and may also include that the first and second features are not in direct contact but are in contact with additional features therebetween. Moreover, the first feature "over", "above", and "upper" of the second feature includes that the first feature is directly above and obliquely above the second feature, or simply indicates that a level height of the first feature is higher than the second feature. The first feature "beneath", "below", and "lower" of the second feature includes the first feature being directly below and diagonally below the second feature, or simply representing that the level height of the first feature is less than the second feature.

The present disclosure provides a pet drinking device, which is configured to provide clear drinking water to pets for a purpose of healthy drinking. Depending on a size of the pets and theirs amount of drinking water, the pet drinking device may be designed to match a volume. In the present disclosure, the pet drinking device includes a support base, a water storage container, a cover member, a water injection channel, a water return channel, a water drinking disc, a water pumping device, and an electric control unit. The support base is placed on one plane in pet living environment, and generally refers to ground. A first accommodation cavity and an accommodation space having at least one opening on one side of the first accommodation cavity are formed on the support base. The first accommodation cavity is configured to contain clear water source, in a better way, an ultraviolet disinfection lamp is disposed on the first accommodation cavity so as to achieve a better effect. The water storage container is capable of being taken out or placed into the accommodation space from the at least one opening, the water storage container is configured to recover waste water, and the water storage container and the support base are of a split type design. When the waste water in the water storage container is full, the water storage container is taken from the opening. In order to achieve positioning and connection between the water storage container and the support base, modes of buckling, magnetic attraction, and threaded connection are adopted. The cover member is formed above the support base to enclose the first accommodation cavity and cover the accommodation space. The water injection channel is formed on the cover member and/or the support base and communicated with the first accommodation cavity. The water return channel is formed on the cover member and/or the water storage container and communicated with an inner cavity of the water storage container. The water drinking disc shows an open shape and is formed on the cover member and connected with the water return channel. The water pumping device is disposed between the support base and the cover member and configured to pump water in the first accommodation cavity to the water drinking disc. The electric control unit is capable of controlling start and stop of the water pumping device, one main purpose of the electric control unit is to control a water pumping cycle. Before water pumping at any time, the water in the water drinking disc is released into the water storage container, and then the water return channel is closed to pump water into the water drinking disc in a pumping manner. In a preferred case, after the water in the water drinking disc is released, there is a delay in closing the return channel so that a clean water source can be used to flush the water drinking disc. In the present, a single-chip microcomputer is disposed in the electric control unit to achieve program control, as a conventional design means in the art, models of the single-chip microcomputer are not listed, those who skilled in the art can select according to demand.

In one embodiment, as shown in FIGS. 1-18, the present disclosure provides a pet drinking device, including three parts. A first part is a support base 1 in a box structure, a first opening is formed on an upper end of the support base 1, a partition plate 2000 longitudinally disposed is disposed in the support base 1. The partition plate 2000 divides the support base 1 into a first accommodation cavity 101 and a second containing cavity, and an upper opening edge of the partition plate 2000 is lower than an opening edge of the first opening. The first accommodation cavity 101 is configured as a clear water containing part, which is configured to contain clear water. A second part is a water storage container 2, the water storage container 2 is configured to recycle waste water, a waste water inlet 3000 is disposed on the water storage container 2, the water storage container 2 is movably disposed on the support base 1 through an opening 102 on the support base 1 like a drawer. After the water storage container 2 is disposed on the support base 1, the water storage container 2 is disposed side by side with the first accommodation cavity 101. A third part is a cover member 3, the cover member 3 is disposed on an upper opening edge of the support base 1, the cover member 3 is mainly configured to install components such as a water pumping pipe, a water pump 5, a motor 6, an electric control valve 7, and a circuit board 8, which are further described below.

In one embodiment, the support base 1 is generally in a racetrack shape, an accommodation space 103 is disposed on the support base 1 beside the first accommodation cavity 101, the opening 102 is communicated with the accommodation space 103, and a number of the opening 102 is one and the opening 102 is disposed on an end portion along a length direction of the support base 1. Certainly, in other embodiments, there may be two or three openings, a racetrack shape design not only meets an aesthetic degree of the pet drinking device, but also ensures that the pet drinking device has fewer corners and prevents collision damage to pets caused by excessive corners. However, as optional solutions, the support base may be other shapes, only the first accommodation cavity and the accommodation space are located at the bottom of the product, center of gravity of the pet drinking device may be ensured to be low, and probability that the product is accidentally knocked down or ran down is reduced.

In one embodiment, the cover member 3 is formed above the support base 1 to enclose the first accommodation cavity 101 and cover the accommodation space 103. Likewise, an overall shape of the cover member 3 is in a racetrack type that matches the support base 1.

The cover member 3 includes a bottom cover 301 and a top cover 302, the bottom cover 301 and the top cover 302 are fixed through threaded connection, the bottom cover 301 is located on one side close to the support base 1, and the top cover 302 is located above the bottom cover 301. An installation space 303 is formed between the bottom cover 301 and the top cover 302. A first pipeline part 3011 extending upward is disposed on a bottom wall of the bottom cover 301, a second pipeline part 3021 protruding inwards is disposed on the top cover 302, the first pipeline part 3011 is communicated with the first accommodation cavity 101, the second pipeline part 3021 penetrates through the top cover 302 and is communicated with an outer portion. After the bottom cover 301 and the top cover 302 are assembled, the first pipeline part 3011 and the second pipeline part 3021 achieve sealing butt joint. Thus, a water injection opening 304 is formed on the second pipeline part 3021 of an upper part of the top cover 302, and the first pipeline part 3011 and the second pipeline part 3021 form a water injection channel 400, in order to prevent water from being polluted and poured out, a cover 81 is disposed on the water injection opening 304 to seal the first accommodation cavity 101.

The water pumping pipe, the water pump 5, the motor 6, the electric control valve 7, and the circuit board 8 are disposed inside the installation space 303. Specifically, the water pump 5 is disposed on the bottom cover 301, a water inlet end of the water pump 5 is connected with the a water inlet pipe 20, a water outlet end of the water pump 5 is connected with a water outlet pipe 30. One end of the water inlet pipe 20 extends into the first accommodation cavity 101 and a float sensor 40 is disposed on the one end of the water inlet pipe 20.

Figure 16:
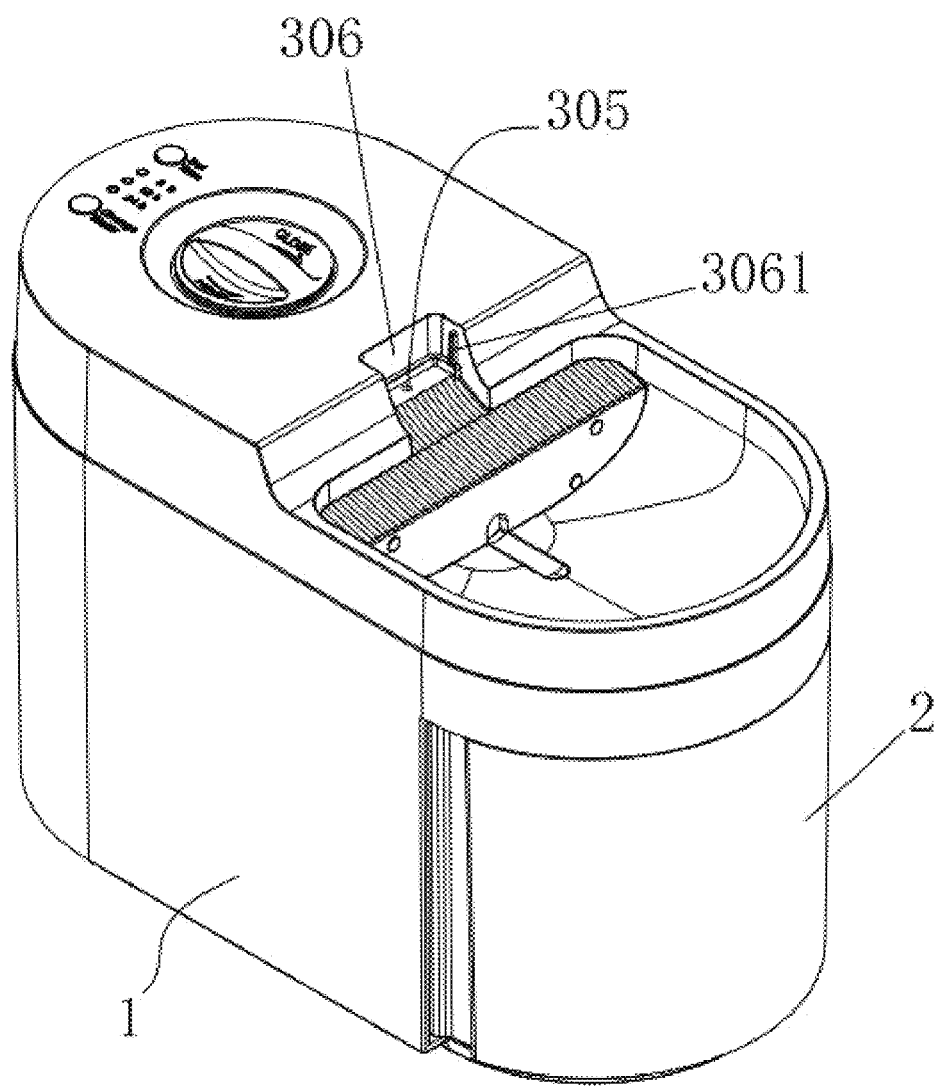
FIG. 16 is a schematic diagram of the pet drinking device after removing a blocking component.
Figure 17:
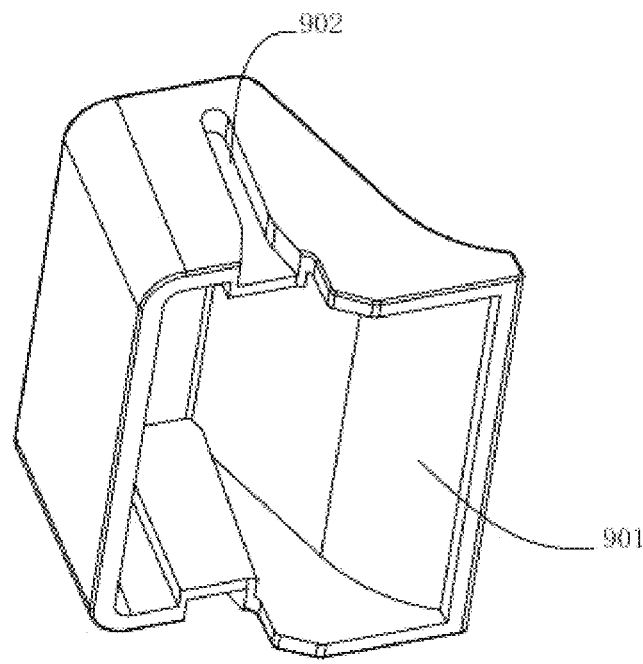
FIG. 17 is a schematic diagram of the blocking component of the pet drinking device.
Figure 18:
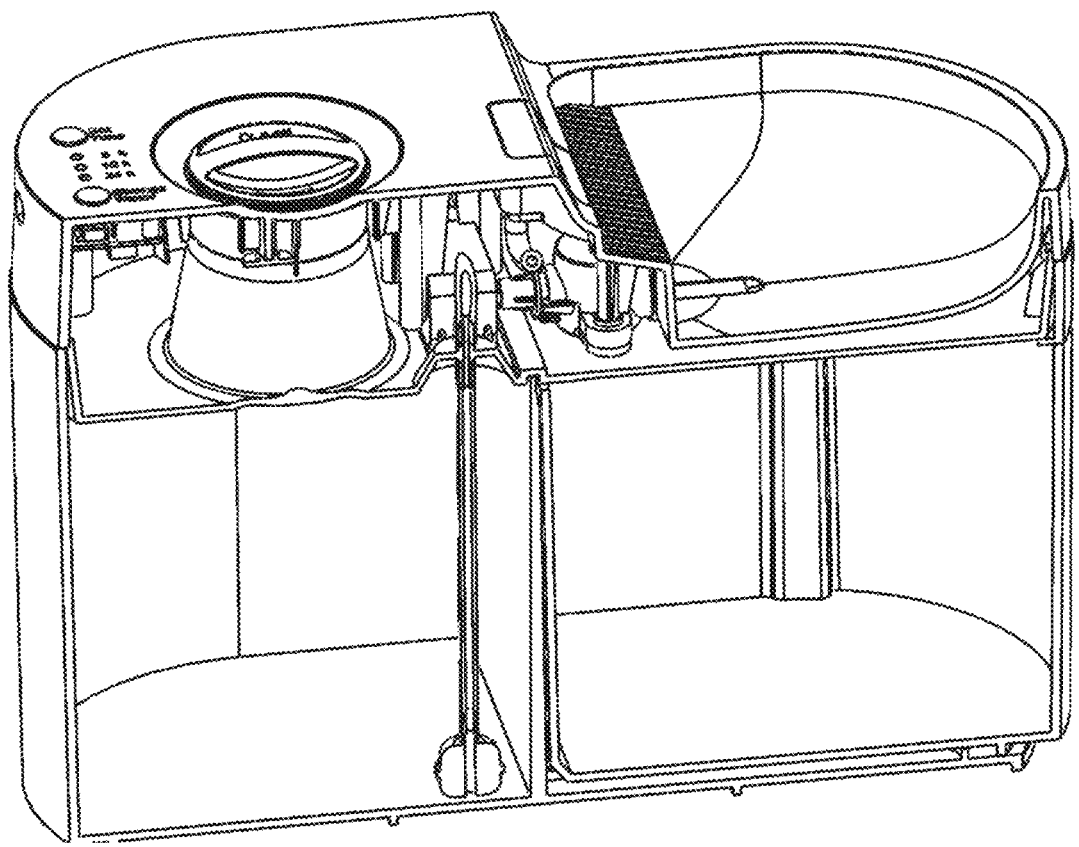
FIG. 18 is a cross-sectional diagram of the pet drinking device in a three-dimensional state.

The top cover 302 is located on one side of the installation space 303, a water drinking disc 4 in an open shape is concavely formed in an outer surface of a partial top of the top cover 302. As shown in FIG. 16, a through hole 305 having an upward opening is formed on the top cover 302, the through hole 305 is communicated with the water drinking disc, and the water outlet pipe 30 is in sealed connection with the through hole 305. Thus, water in the first accommodation cavity 101, driven by the water pump 5, flows into the water drinking disc 4 sequentially through the water inlet pipe 20, the water pump 5, and the water outlet pipe 30. As a preferred solution, as shown in FIG. 17, in one embodiment, A water outlet of the water outlet pipe 30 is upwards sprayed. A blocking component 6, having a plate-shaped surface, is disposed on the cover member 3. Specifically, the blocking component 6 is configured to be a buckle cover, a evenly-striped platform 402 is obliquely disposed inside the water drinking disc 4, and a plurality of fine grooves 4021 are disposed on the evenly-striped platform 402. The blocking component 9 is configured to change a water spraying direction, and water flow is splashed and slowly flows back to the evenly-striped platform, and then flows downwards through the plurality of the fine grooves 4021. In order to better achieve an effect of splashing and flowing back, a water discharging surface 901 in a plate shape is disposed on the blocking component 9, the water discharging surface 901 is obliquely disposed with respect to a gravity direction. In a preferred embodiment, a degree of inclination of the water discharging surface 901 is substantially equivalent to a degree of inclination of the evenly-striped platform 402.

In order to facilitate installation of the blocking component 9, a groove 306 is disposed on an upper portion of the top cover 302, the through hole 305 is located in the groove 306, two protruding rib strips 3061 are symmetrically disposed on a side wall of the groove 306, two sliding grooves 902 are correspondingly disposed on the blocking component 9, the blocking component 9 is movably disposed on the top cover 302 through cooperation of the rib strips 3061 and the sliding groove 902, and a pipeline may be cleaned conveniently.

A water discharging hole 401 is disposed on one side, close to the installation space 303 of a bottom of the water drinking disc 4, a water inlet of the electric control valve 7 is in sealing connection with the water discharging hole 401, an end of a water outlet of the electric control valve 7 is disposed downwards and is configured to communicate with the water storage container 2.

In one embodiment, as shown in FIGS. 6, 8, and 12-14, an assembly relationship of the motor 6 and the electric control valve 7 is as following. An output shaft of the motor 6 is rotatably connected with a rotating shaft 50. The electric control valve 7 includes a valve body 701 and a valve core 702, and the valve core 702 is connected with the rotating shaft 50. The water inlet 7011 and the water outlet 7012 are disposed on the valve body 701. The water inlet 7011 is communicated with the water drinking disc 4, and the water outlet is downwardly suspended, which is configured to communicated with the water storage container 2. The valve core 702 is disposed on the valve body 701 between the water inlet 7011 and the water outlet 7012, and the rotating shaft 50 drives the valve core 702 to rotate to block or open the water outlet 7012. As a preferred structure, the electric control valve is a ball valve, and a rotation angle of the output shaft of the motor is set so as to achieve a purpose of opening or closing the electric control valve. In one embodiment, the water discharging hole 401 and the valve core 702 together form a water return channel 600. In other embodiments, a pipeline or channel may also be additionally disposed to form the water return channel.

In one embodiment, the pet drinking device further includes a first sensing component configured to sense a water level in the first accommodation cavity 101 and a second sensing component configured to sense a water level in the water drinking disc 4. The water pump 5 and the motor 6 are controlled by the electric control unit, and the electric control unit is configured to set a water changing period, for example, the water changing period is six hours, a timer starts when a preset amount of water is injected from the pet drinking disc 4, and when time reaches six hours, the motor 6 starts the output shaft to rotate to a preset position, in this process, the motor 6 drives the electric control valve 7 to open, and water in the water drinking disc 4 flows into the water storage container 2. After the water finishes flowing in the water drinking disc 4, the motor 6 runs again, and the output shaft of the motor 6 rotates to another preset position, in this process, the motor 6 drives the electric control valve 7 to close, and then the water pump 5 starts; clean water, driven by the water pump 5, flows into the water drinking disc 4 sequentially through the water inlet pipe 20, the water pump 5, and the water outlet pipe 30, and a water level sensor 80 is disposed on the water drinking disc 4, and when the water level sensor 80 detects that water injection reaches a preset high water level, the electric control unit controls the water pump 5 to close. In any period, if the water in the water drinking disc 4 is drunk by the pets, the water level sensor 80 detects that the water in the water feeding disc 4 is at a preset low water level, the electric control unit controls the water pump 5 to open until the water level reaches the preset high water level, then the water pump 5 is turned off, and at this time, the water changing period starts to recalculate. In one embodiment, according to experience and experimental testing, the water changing period is set to be three types, one period every six hours, one period every twelve hours, and one period every twenty four hours, respectively. When environment is better, the water changing period may be set to a longer every twenty four hours, whereas, if the environment is poor, the period may be set to be shorter every six hours.

In order to facilitate mode operation, in the one embodiment, a control switch 100 is disposed on the top cover 302, the control switch 100 is configured to set a plurality of water changing period modes, and the control switch 100 may be selected as a pressing switch, a touch switch, or a display screen touch control. Certainly, in other embodiments, the control switch may be further disposed on the support base 1. In one embodiment, the pet drinking device further includes an alarm indication device 200 configured to feed back sound and/or light when lacking clear water. Specifically, the alarm indication device 200 is an indicator light, which is located on the control switch, and when the water level of the clear water reaches the preset low water level, the indicator light is turned on. In other embodiments, the alarm indication device 200 may also be a sounding device, such as by a horn, or both have a light indication as well as a sound indication.

In one embodiment, the electric control unit includes a circuit board 8, a battery (not shown in the drawings), and a power transmission end 12. The circuit board 8 and the battery are both disposed on the installation space 303, and a hole matching with the power transmission end 12 is disposed on the top cover 302. Specifically, the battery is preferably a rechargeable battery, and the power transmission end 12 is a charging terminal disposed on the circuit board 8, preferably a Type-C terminal. Certainly, in other embodiments, the battery is not provided, the electric control unit is directly connected with the circuit board through a power transmission line, and compared with a mode of setting the battery, convenience in a use process is reduced.

In one embodiment, a material of the support base 1 is preferably an injection molding material, so that the first accommodation cavity 101 is integrally formed with the support base 1, and the water storage container 2 is also preferably an injection molding material, so that production efficiency may be effectively improved. In one embodiment, it is preferable that a water storage volume of the first accommodation cavity 101 is not greater than a volume of the water storage container 2, and the water in the water storage container 2 may not overflow even if the water storage volume of the first accommodation cavity 101 is not drunk by the pet in a longer time. Considering consumption of drinking of the pets, the water storage volume of the first accommodation cavity 101 may be slightly greater than the volume of the water storage container 2, but is not suitable for too much too much.

In other embodiments, a clear water tank may also be independently disposed in the first accommodation cavity 101, similarly, a volume of the clear water tank is not greater than the volume of the water storage container 2 or the volume of the clear water tank is slightly greater than the volume of the water storage container 2, and an opening for taking and placing the clear water tank is disposed on the support base 1.

In one embodiment, a U-shaped guide rail 201 is disposed on a bottom of the water storage container 2, two straight strip-shaped guide blocks 1031 matched with the U-shaped guide rail 201 are disposed on a bottom of the accommodation space 103. An elastic buckle 1032 is disposed between the two straight strip-shaped guide blocks 1031. A raised clamping platform 202 is disposed inside an area surrounded by the U-shaped guide rail 201 on the bottom of the water storage container 2, and the raised clamping platform 202 is configured to match with the elastic buckle 1032. When the water storage container 2 is loaded into the support base 1, the water storage container 2 does not slide out of the support base 1 without external force drawing due to cooperation of the raised clamping platform 202 and the elastic buckle 1032, so that an effect of fixing installation is achieved.

In one embodiment, a through hole is disposed on a bottom wall of the support base 1, and the elastic buckle 1032 is disposed in the through hole. If the water storage container 2 cannot be normally pulled out from the support base 1 due to accidents, the elastic buckle 1032 can be pried out at an outer side of a bottom of the support base 1, and then the water storage container 2 is pulled out.

In one embodiment, the water level sensor 80 in the water drinking disc 4 is disposed on a side wall below the evenly-striped platform 402, the water level sensor 80 is connected with the electric control unit and controlled by the electric control unit.

In one embodiment, in order to facilitate taking the water storage container 2 from the support base 1, grooves 203 for placing a finger are disposed on both sides of the water storage container 2. Certainly, as other embodiments, a protrusion may also be provided. As a better way, in the present embodiment, a location of the grooves 203 are close to the opening 102.

In one embodiment, since the support base 1 is generally in the racetrack shape, and an outer surface of the water storage container 2 is matched with a shape of the support base 1, the outer surface of the water storage container 2 is generally semi-circular, so that when the water storage container 2 is taken out, the grooves 203 are conveniently grasped by different people, regardless of sizes of different palms, and force may be better enabled.

In one embodiment, the waste water inlet 3000 on the water storage container 2 is an open structure. In other embodiments, the waste water inlet may also be a bell mouth structure, which has better structural effect, and may further prevent waste water overflow caused by shaking.

In one embodiment, a transparent part 2001 is disposed on a side wall of the support base 1 corresponding to the first accommodation cavity 101, a water level height identification line 2002 is disposed on the transparent part 2001, and the water level height identification line includes a highest water level identification line. A height of the partition plate 2000 is not lower than the highest water level identification line, and a height of an opening edge of the waste water inlet on the water storage container 2 is not lower than the highest water level identification line.

In one embodiment, an anti-skid pad 1035 is disposed on the bottom of the support base 1, certainly, in other embodiments, a suction cup structure may also be disposed on the bottom of the support base 1.

In other embodiments, based on the present embodiment, an environment illuminance sensor, an infrared sensor and an illuminating lamp are disposed near the water drinking disc, and when ambient light illuminance is insufficient, if the pets or the human beings are close to the water drinking device, the illuminating lamp is automatically opened, and according to the setting, the pet owner may better observe a situation of the water drinking disc.

In one embodiment, as a preferred embodiment, a speed reduction reversing mechanism 900 is disposed between the motor and the electric control valve.

In other embodiments of the present disclosure, the pet drinking device further includes a speaker unit, which attracts the pets through playing a sound of interest to the pets.

In one embodiment, electronic components and water storage components are separated from each other, so that circuit can be effectively protected from being damaged.

The present disclosure adopts a structure of transverse layout, so that center of gravity of the pet drinking device is low, and possibility that the pet drinking device is knocked down or knocked down is reduced. The present disclosure adopts the water storage container to contain water, the water storage container is conveniently taken or placed through disposing the opening on the support base, and meanwhile, due to a fact that the cover member covers the accommodation space, possibility that the waste water is spilled by a large amount can be reduced. The cover member and the support base are of a split type design, so that installation and disassembly are facilitated, and cleaning of the pet drinking device is facilitated. The electric control unit is configured to control the water pumping device to start and stop, water which is not drunk by the timeout can be replaced in time, and water is prevented from being polluted, so that health of pets is guaranteed, and human health is also facilitated.

In the description of this specification, reference to terms "one embodiment", "some embodiments", "one embodiment", "some embodiments", "example", "specific example", or "some examples" and so on, means that a particular feature, structure, material, or characteristic described in connection with the embodiment or example is included in at least one embodiment or example of the present disclosure. In this specification, a schematic representation of the above term does not necessarily refer to the same embodiment or example. Furthermore, the particular features, structures, materials, or characteristics described may be combined in any suitable manner in any one or more embodiments or examples.

The foregoing is a further detailed description of the present disclosure when taken in connection with the accompanying drawings, which are not to be construed as limiting the present disclosure. As those who skilled in the art to which the present disclosure belongs, a number of simple deduction or replacement may also be made without departing from the inventive concept.

What is claimed is:

1. A pet drinking device, comprising:
   a support base;
   a water storage container;
   a cover member;
   a water injection channel;
   a water return channel;
   a water drinking disc;
   a water pumping device; and
   an electric control unit;
   wherein a first accommodation cavity and an accommodation space on one side of the first accommodation cavity are formed on the support base, the accommodation space has at least one opening; the water storage container is capable of being taken out or placed into the accommodation space from the at least one opening; the cover member is formed above the support base to enclose the first accommodation cavity and cover the accommodation space; the water injection channel is formed on the cover member and/or the support base and communicating with the first accommodation cavity; the water return channel is formed on the cover member and/or the water storage container and communicating with an inner cavity of the water storage container; the water drinking disc is formed on the cover member and connected with the water return channel; the water pumping device is disposed between the support base and the cover member and configured to pump water in the first accommodation cavity to the water drinking disc; and the electric control unit is capable of controlling start and stop of the water pumping device.

2. The pet drinking device according to claim 1, wherein the first accommodation cavity is integrally formed with the support base, the first accommodation cavity is configured to store clear water, and the water injection channel is communicated with the first accommodation cavity; or
   a clear water tank is disposed inside the first accommodation cavity, the water injection channel is communicated with the clear water tank, and an opening for taking and placing the clear water tank is disposed on the support base.

3. The pet drinking device according to claim 2, wherein an electric control valve is disposed on the water return channel, and the electric control valve is controlled to be connected with the electric control unit.

4. The pet drinking device according to claim 3, wherein the water pumping device comprises a water inlet pipe, a water outlet pipe, and a water pump; one end of the water inlet pipe is connected with a water inlet end of the water pump, and another end of the water inlet pipe extends into the first accommodation cavity; one end of the water outlet pipe is connected with a water outlet end of the water pump, and another end of the water outlet pipe is communicated with the water drinking disc.

5. The pet drinking device according to claim 3, wherein a motor is disposed on the cover member; the motor is controlled to be connected with the electric control unit, and an output shaft of the motor is rotatably connected with a rotating shaft; the electric control valve comprises a valve body and a valve core, and the valve core is connected with the rotating shaft; a water inlet and a water outlet are disposed on the valve body; the water inlet is communicated with the water drinking disc, the water outlet is communicated with the water storage container; the valve core is disposed on the valve body between the water inlet and the water outlet; and the rotating shaft drives the valve core to rotate to block or open the water outlet.

6. The pet drinking device according to claim 2, wherein a U-shaped guide rail is disposed on a bottom of the water storage container, two straight strip-shaped guide blocks matched with the U-shaped guide rail are disposed on a bottom of the accommodation space; an elastic buckle is disposed between the two straight strip-shaped guide blocks; a raised clamping platform is disposed inside an area surrounded by the U-shaped guide rail on the bottom of the water storage container, and the raised clamping platform is configured to match with the elastic buckle; the support base is generally in a racetrack shape, and a number of the opening of the accommodation space is one and the opening of the accommodation space is disposed on an end portion along a length direction of the support base.

7. The pet drinking device according to claim 2, comprising a first sensing component configured to sense a water level in the first accommodation cavity and a second sensing component configured to sense a water level in the water drinking disc.

8. The pet drinking device according to claim 4, wherein the water outlet of the water outlet pipe sprays water upwardly; a blocking component, having a plate-shaped surface, and an evenly striped platform are disposed on the cover member; the evenly-striped platform is obliquely disposed inside the water drinking disc, the blocking component is configured to change a water spraying direction, and water flow is splashed and slowly flows back to the evenly-striped platform.

9. The pet drinking device according to claim 1, wherein the cover member comprises a bottom cover and a top cover; an installation space is formed between the bottom cover and the top cover; the water pumping device is disposed inside the installation space; the water injection channel penetrates through the bottom cover and the top cover, and a cover is disposed on the water injection channel.

10. The pet drinking device according to claim 1, wherein a control switch having at least one mode selection is disposed on the cover and the support base, and the at least one mode selection at least comprises a water changing period setting.

11. The pet drinking device according to claim 1, further comprising an alarm indication device configured to feed back sound and/or light when lacking clear water.

* * * * *